May 5, 1959     J. WINSON     2,884,643
METHOD OF APPLYING ELASTIC TO THERMOPLASTIC SHEETING
Filed Feb. 1, 1957
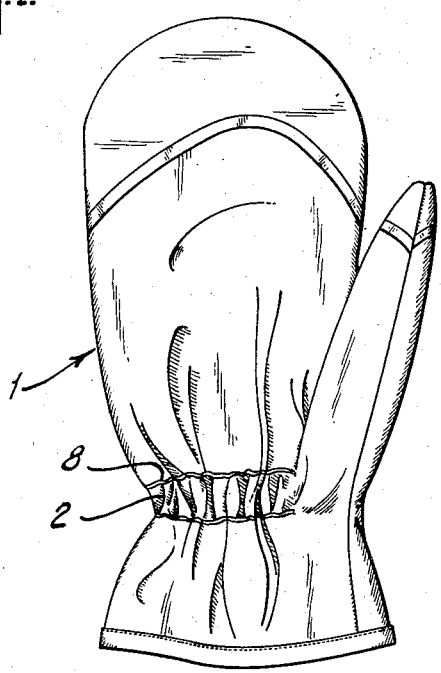
Fig. 1.
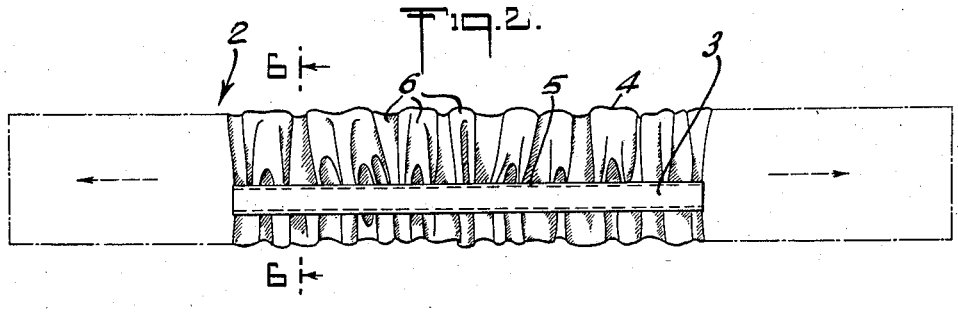
Fig. 2.
Fig. 3.
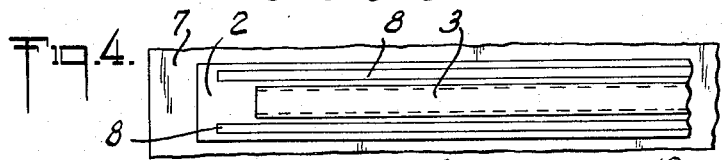
Fig. 4.
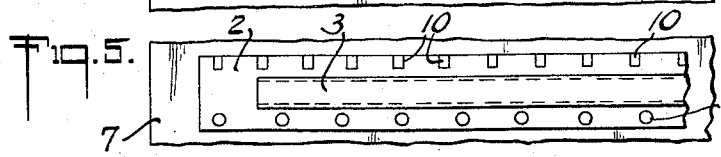
Fig. 5.
Fig. 6.
INVENTOR
JONATHAN WINSON
BY
ATTORNEY United States Patent Office
2,884,643
Patented May 5, 1959

2,884,643

METHOD OF APPLYING ELASTIC TO THERMOPLASTIC SHEETING

Jonathan Winson, New York, N.Y.

Application February 1, 1957, Serial No. 637,651

2 Claims. (Cl. 2—158)

The present invention relates to articles made of thermoplastic sheeting, and particularly to a method of attaching an elastic member to the sheeting such as may be used in mitten manufacture.

Thermoplastic sheeting is used in the fabrication of many varied articles including mittens which are of waterproof construction. Heretofore, elastic members have been placed on the wrist portions of mittens to gather the surplus material, thus improving the fit of the mitten as well as preventing the entry of snow and moisture. The elastic member has generally been made of rubber or a rubber-like material which has been encased in a woven fiber material to form an elastic strip which has been attached to the thermoplastic strip by sewing. Such constructions have not been wholly satisfactory as the punctures made by the needle have destroyed the waterproof characteristic of the article. Furthermore, the woven fiber material has been found to absorb considerable moisture in its interstices and requires considerable time for the moisture to be dried out.

The present invention aims to overcome the foregoing difficulties and disadvantages of prior means of securing the elastic to the thermoplastic sheeting by providing a construction which is completely waterproof. Furthermore, the elastic may be positioned within the article or inside the mitten so that it will not become wetted.

In accordance with the invention, this is accomplished by attaching an elastic member to a plastic strip by any conventional method as by sewing. The plastic strip with its attached elastic member is then heat sealed to the plastic sheeting.

The invention is advantageous in that the elastic member may be attached to the plastic strip in long lengths which may be cut to size as required.

Another object of the invention is to provide a method of applying elastic to plastic sheeting which is simple and economical in performance, and which produces a product rugged in use.

Other objects and advantages of the invention will be apparent from the following description and from the accompanying drawings which show, by way of example, an embodiment of the invention.

In the drawings:

Figure 1 is a front view of a plastic heat sealed mitten with elastic applied using the method in accordance with the invention.

Figure 2 is a top view of a plastic strip with an elastic member attached thereto by sewing.

Figure 3 is an edge view of the elastic member shown in Figure 2.

Figure 4 shows a fragmentary top view of a piece of sheeting with an elastic strip attached thereto.

Figure 5 is a view corresponding to Figure 1, but illustrating different methods of attaching the elastic strip to the sheeting.

Figure 6 is a sectional view taken along the line 6—6 of Figure 2.

Referring to the drawings, there is shown a mitten 1 having its wrist portion gathered in by an elastic strip 2 applied in accordance with the invention. The mitten may be of the type shown in my copending application Serial No. 637,646, filed February 1, 1957, now United States Patent No. 2,809,376, issued October 15, 1957.

In Figure 2 the elastic strip member is shown in top view and discloses a conventional elastic tape 3 attached to a plastic strip member 4 by means of sewing 5 or other conventional means. The elastic tape 3 may be of the conventional type used in the clothing industry and may be of the type which includes a plurality of elongated rubber bands or members attached in a flat fiber webbing which holds the rubber members in a single plane. In attaching the elastic tape 3 to the plastic strip 4, the plastic strip 4 is held positioned flat and unstretched while the elastic tape 3 is stretched and sewn to the plastic strip 4 while in the stretched condition, the stitches being indicated by the numeral 5. After being released, the tape 3 contracts gathering the plastic strip 4 as indicated at 6.

In applying the completed elastic strip 2 to a thermoplastic sheeting 7, it is placed in position and the plastic strip 4 is extended so as to lie flat on the sheeting 7. Electronic heat sealing means, well known in the art, is used to secure the plastic strip 4 to the sheeting, such a seam being indicated at 8 on the completed mitten of Figure 1. While the electronic seam 8 is indicated as being in a straight line on each side of the elastic tape 3, as shown in Figures 1 and 4, the plastic strip 4 might equally as well be attached by spot seaming methods, as shown in Figure 5 at 9. Also in Figure 5 as indicated at 10, the seam may be a plurality of transversely extending lines, or various combinations of the various type seaming methods may be used.

It is preferable that the completed elastic strip 2 be applied to the sheeting 7 before the sheeting is fabricated into an article such as the mitten 1. In this event, the completed elastic strip 2 may be attached to the side of the sheeting 7 forming the inside of the mitten. By this construction the elastic tape 3 is protected from the weather and moisture and the normal moisture-resisting characteristic of the sheeting 7 is retained as contrasted to the method in which the strip is attached by sewing.

While the invention has been described and illustrated with respect to a specific embodiment thereof, it is obvious that other embodiments may be resorted to without departing from the invention. Therefore, the form of the invention set out above should be considered as illustrative and not as limiting the scope of the following claims.

I claim:

1. A heat sealed waterproof vinyl hand covering made from flat vinyl sheeting, the finished hand covering having palm and back sides, the palm and back sides heat sealed together along at least their finger tip marginal edge providing an edge seam, the heat sealed construction turned inside out providing a hand covering with a reversed seam fabrication, the improvement wherein the flat vinyl sheeting of the wrist portion of the hand covering is elastically shirred on at least a portion thereof, a rubber elastic tape and a vinyl strip providing the shirring, the vinyl strip being heat sealed to the vinyl sheeting of the hand covering along its longitudinal edges with the rubber elastic tape therebetween, the rubber elastic tape having been secured along its length to the said strip while the tape was in stretched condition, the heat seal forming a channel in which the rubber elastic tape is received, whereby when the complete assembly is relaxed the rubber elastic tape maintains the wrist portion of the vinyl sheeting of the hand covering under the vinyl strip elastically shirred.

2. A heat sealed waterproof vinyl hand covering made from flat vinyl sheeting, the finished hand covering having palm and back sides, the palm and back sides heat sealed together along at least their finger tip marginal edge providing an edge seam, the heat sealed construction turned inside out providing a hand covering with a reversed seam fabrication, the improvement wherein the flat vinyl sheeting of the wrist portion of the hand covering is elastically shirred on at least a portion thereof, a rubber elastic tape and a vinyl strip providing the shirring, the rubber elastic tape sewn along its length to the vinyl strip, said vinyl strip being expansibly shirred by the rubber elastic tape, the shirred vinyl strip thereafter being heat sealed to the flat vinyl sheeting along its longitudinal edges while the shirred vinyl strip and tape were expanded, whereby when the complete assembly is relaxed the rubber elastic tape maintains the wrist portion of the vinyl sheeting of the hand covering under the vinyl strip elastically shirred.

References Cited in the file of this patent

UNITED STATES PATENTS

| | | |
|---|---|---|
| 194,062 | Wales | Aug. 14, 1877 |
| 1,544,312 | Gray | June 30, 1925 |
| 2,053,144 | Gowdy | Sept. 1, 1936 |
| 2,274,335 | Kennedy | Feb. 24, 1942 |
| 2,484,340 | Gardner | Oct. 11, 1949 |
| 2,540,234 | Berger et al. | Feb. 6, 1951 |
| 2,619,648 | Hardie | Dec. 2, 1952 |
| 2,669,535 | Orr | Feb. 16, 1954 |
| 2,782,421 | Winson | Feb. 26, 1957 |

OTHER REFERENCES

Article, "An Electronic Sewing Machine," from the August 1943 issue of "Electronics." (Copy in Division 24.)